United States Patent
Alouhali et al.

(10) Patent No.: US 11,346,072 B2
(45) Date of Patent: May 31, 2022

(54) FLOW BARRIER TO PREVENT INFILTRATION OF WASTEWATER FROM WASTEWATER DISPOSAL PONDS

(71) Applicant: Saudi Arabian Oil Company, Dhahran (SA)

(72) Inventors: Raed Alouhali, Dhahran (SA); Omar Shaiji, Dhahran (SA); Md Amanullah, Dhahran (SA); Mohammad Alotaibi, Dhahran (SA); Mohammad Saud Al-Badran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/922,487

(22) Filed: Jul. 7, 2020

(65) Prior Publication Data
US 2022/0010208 A1 Jan. 13, 2022

(51) Int. Cl.
*E02D 31/04* (2006.01)
*E02D 31/00* (2006.01)
*C09K 17/40* (2006.01)

(52) U.S. Cl.
CPC ............ *E02D 31/004* (2013.01); *C09K 17/40* (2013.01)

(58) Field of Classification Search
CPC .... E02D 2300/0051; E02D 2300/0065; E02D 2300/0067; E02D 2300/0054; E02D 31/004; E02B 3/12; E02B 3/124; C09K 17/40
See application file for complete search history.

(56) References Cited

U.S. PATENT DOCUMENTS

| | | | |
|---|---|---|---|
| 4,422,948 A | 12/1983 | Corley et al. | |
| 5,378,278 A * | 1/1995 | Colburn | C04B 28/26 106/709 |
| 5,915,879 A * | 6/1999 | Burnett | E02B 3/108 405/116 |
| 6,098,712 A | 8/2000 | Burts, Jr. | |
| 6,790,812 B2 | 9/2004 | Halliday et al. | |
| 9,932,510 B2 | 4/2018 | Walker et al. | |
| 2004/0129460 A1 | 7/2004 | MacQuoid et al. | |
| 2017/0137688 A1 * | 5/2017 | Amanullah | C09K 8/514 |
| 2017/0298263 A1 * | 10/2017 | Amanullah | C09K 8/514 |

(Continued)

FOREIGN PATENT DOCUMENTS

| | | |
|---|---|---|
| CN | 109439299 A | 3/2019 |
| WO | 0166275 A2 | 9/2001 |

(Continued)

OTHER PUBLICATIONS

International Search Report and Written Opinion for International Application No. PCT/US2021/040695, report dated Oct. 26, 2021; pp. 1-14.

*Primary Examiner* — Janine M Kreck
(74) *Attorney, Agent, or Firm* — Bracewell LLP; Constance G. Rhebergen; Brian H. Tompkins

(57) ABSTRACT

A flow barrier for wastewater disposal ponds or pits used in oil and gas operations. The flow barrier includes a flake component, a fiber component, and a granular component. The disposal pond flow barrier may prevent the infiltration or leakage of aqueous fluids from the wastewater disposal ponds into the surrounding environment and ecosystems. A process for manufacturing and using the flow barrier in a wastewater disposal pond is also provided.

11 Claims, 1 Drawing Sheet

(56) References Cited

U.S. PATENT DOCUMENTS

2018/0127632 A1   5/2018  Amanullah
2018/0230360 A1   8/2018  Walker et al.

FOREIGN PATENT DOCUMENTS

WO   2012048215 A2   4/2012
WO   2016019416 A1   2/2016
WO   2018009203 A1   1/2018

* cited by examiner

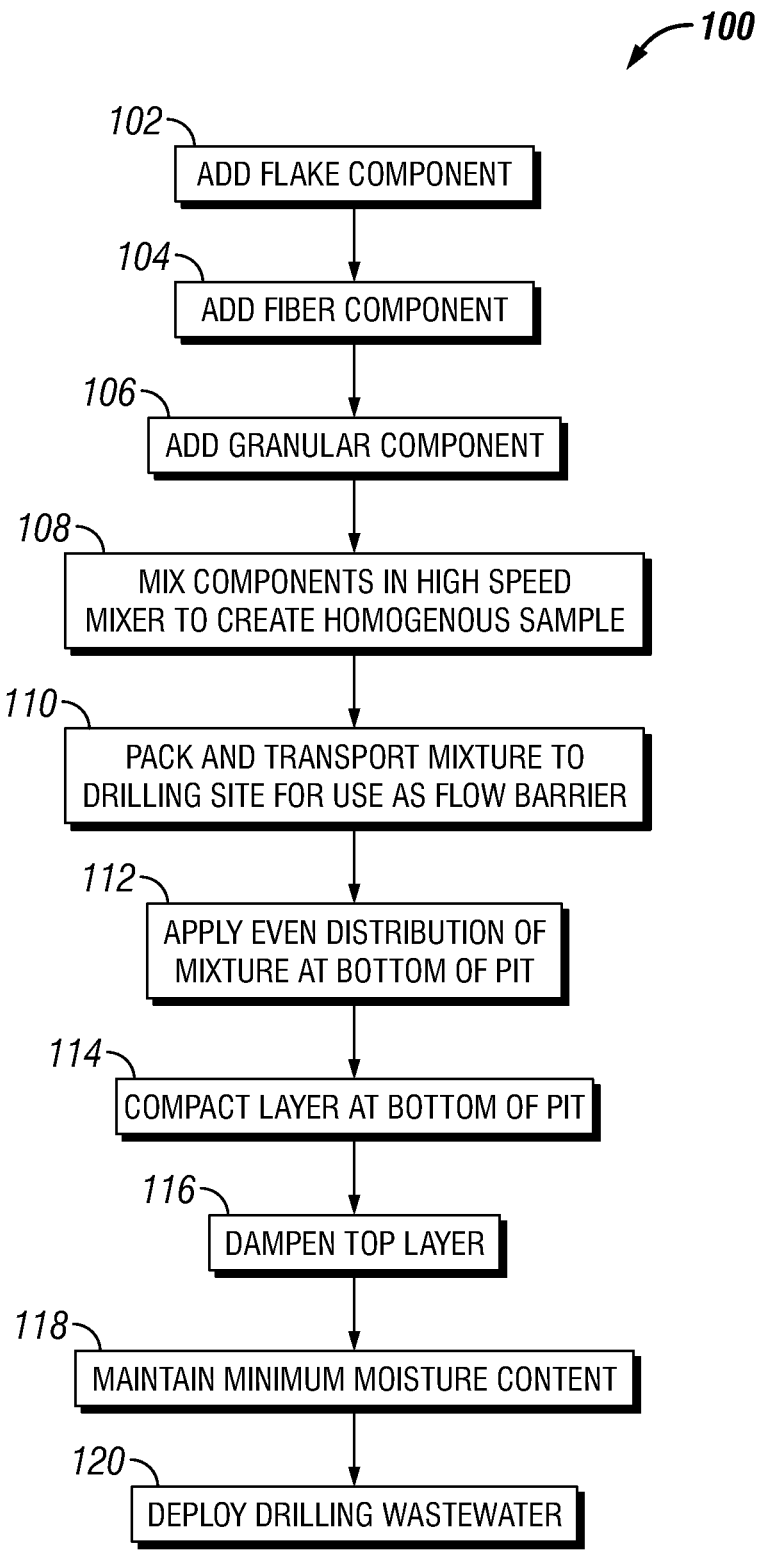

FLOW BARRIER TO PREVENT INFILTRATION OF WASTEWATER FROM WASTEWATER DISPOSAL PONDS

BACKGROUND

Field of the Disclosure

The present disclosure generally relates to wastewater disposal in oil and gas drilling operations. More specifically, embodiments of the disclosure relate to preventing or reducing the infiltration of wastewater from wastewater disposal ponds.

Description of the Related Art

Temporary wastewater disposal ponds (also referred to as "pits") are used in oil and gas drilling operations. Wastewater disposal ponds may be used for the collection and disposal of drilling fluids, drilling mud, cuttings, clean water, and any other waste from drilling operations. There are several techniques for processing the waste material depending on the content in the wastewater disposal ponds.

SUMMARY

Various aqueous fluids in wastewater disposal ponds may be capable of infiltrating the surrounding environment and possibly contaminating groundwater or other resources. Existing techniques for preventing or reducing such infiltration may be ineffective and expensive.

Embodiments of the disclosure may reduce or eliminate the seepage or infiltration of aqueous fluid of wastewater ponds in both vertical and radial directions to prevent contamination of the surrounding environments (for example, farmland and vegetation) and ecosystems In some embodiments, a method for reducing or preventing infiltration of wastewater from a disposal pond is provided. The method includes applying a layer of a flow barrier composition to a bottom of the disposal pond. The flow barrier composition includes a flake component including a plurality of mica flakes, a plurality of cellophane flakes, or a combination thereof, a fiber component including a plurality of cellulose fibers, a plurality of date tree fibers, or a combination thereof, such that the plurality of date tree fibers includes fibers formed from date tree trunks, and a granular component including a plurality of ground nut hulls, a plurality of ground date tree seeds, or a combination thereof.

In some embodiments, the flow barrier composition consists of the flake component including the plurality of mica flakes, the plurality of cellophane flakes, or a combination thereof, the fiber component including the plurality of cellulose fibers, the plurality of date tree fibers, or a combination thereof, and the granular component including the plurality of ground nut hulls, the plurality of ground date tree seeds, or a combination thereof. In some embodiments, the flake component is selected from the group consisting of the plurality of mica flakes, the plurality of cellophane flakes, and a combination thereof. In some embodiments, the fiber component is selected from the group consisting of the plurality of cellulose fibers, the plurality of date tree fibers, or a combination thereof. In some embodiments, the granular component is selected from the group consisting of the plurality of ground nut hulls, the plurality of ground date tree seeds, or a combination thereof. In some embodiments, the method includes maintaining a moisture content in the flow barrier composition, the moisture content in the range of 6% to 8%. In some embodiments, the layer has a thickness in the range of 5 centimeters (cm) to 15 cm. In some embodiments, the method includes compacting the flow barrier to the thickness after applying the layer of a flow barrier composition to the bottom of the disposal pond. In some embodiments, the method includes disposing of wastewater into the disposal pond after applying the layer of the flow barrier composition. In some embodiments, the plurality of date tree fibers have a size in the range of 100 microns ($\mu$m) to 5000 $\mu$m. In some embodiments, the plurality of date tree seed particles have a size in the range of 100 microns ($\mu$m) to 3500 $\mu$m. In some embodiments, the flake component is an amount in the range of 30% by weight of the total weight (w/w %) to 45 w/w %, the fiber component is an amount in the range of 25 w/w % to 40 w/w %, and the granular component is an amount in the range of 30 w/w % to 45 w/w %

In another embodiment, a flow barrier composition is provided. The composition includes a flake component including a plurality of mica flakes, a plurality of cellophane flakes, or a combination thereof, a fiber component including a plurality of cellulose fibers, a plurality of date tree fibers, or a combination thereof, such that the plurality of date tree fibers includes fibers formed from date tree trunks, and a granular component including a plurality of ground nut hulls, a plurality of ground date tree seeds, or a combination thereof.

In some embodiments, the flow barrier composition consists of the flake component including the plurality of mica flakes, the plurality of cellophane flakes, or a combination thereof, the fiber component including the plurality of cellulose fibers, the plurality of date tree fibers, or a combination thereof, and the granular component including the plurality of ground nut hulls, the plurality of ground date tree seeds, or a combination thereof. In some embodiments, the flake component is selected from the group consisting of the plurality of mica flakes, the plurality of cellophane flakes, and a combination thereof. In some embodiments, the fiber component is selected from the group consisting of the plurality of cellulose fibers, the plurality of date tree fibers, or a combination thereof. In some embodiments, the granular component is selected from the group consisting of the plurality of ground nut hulls, the plurality of ground date tree seeds, or a combination thereof. In some embodiments, the plurality of date tree fibers have a size in the range of 100 microns ($\mu$m) to 5000 $\mu$m. In some embodiments, the plurality of date tree seed particles have a size in the range of 100 microns ($\mu$m) to 3500 $\mu$m. In some embodiments, the flake component is an amount in the range of 30% by weight of the total weight (w/w %) to 45 w/w %, the fiber component is an amount in the range of 25 w/w % to 40 w/w %, and the granular component is an amount in the range of 30 w/w % to 45 w/w %.

In another embodiment, a method of manufacturing a flow barrier composition for reducing or preventing infiltration wastewater from a disposal pond is provided. The method includes providing a flake component including a plurality of mica flakes, a plurality of cellophane flakes, or a combination thereof, and adding a fiber component to the flake component to form a mixture, the fiber component including a plurality of cellulose fibers, a plurality of date tree fibers, or a combination thereof, such that the plurality of date tree fibers includes fibers formed from date tree trunks. The method also includes adding a granular component to the mixture, the granular component including a plurality of ground nut hulls, a plurality of ground date tree seeds, or a combination thereof, and blending the mixture to form the flow barrier composition.

In some embodiments, the flake component is selected from the group consisting of the plurality of mica flakes, the plurality of cellophane flakes, and a combination thereof. In some embodiments, the fiber component is selected from the group consisting of the plurality of cellulose fibers, the plurality of date tree fibers, or a combination thereof. In some embodiments, the granular component is selected from the group consisting of the plurality of ground nut hulls, the plurality of ground date tree seeds, or a combination thereof. In some embodiments, the plurality of date tree fibers have a size in the range of 100 microns (μm) to 5000 μm. In some embodiments, the plurality of date tree seed particles have a size in the range of 100 microns (μm) to 3500 μm. In some embodiments, the flow barrier composition includes the flake component in an amount in the range of 30% by weight of the total weight (w/w %) to 45 w/w %, the fiber component in an amount in the range of 25 w/w % to 40 w/w %, and the granular component in an amount in the range of 30 w/w % to 45 w/w %.

BRIEF DESCRIPTION OF THE DRAWINGS

FIG. 1 is block diagram of a process for manufacturing and using a wastewater disposal pond flow barrier in accordance with an embodiment of the disclosure.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure are directed to a flow barrier (also referred to as a "flow barrier composition") for wastewater disposal ponds (also referred to as "pits") used in oil and gas operations. The disposal pond flow barrier includes a flake component, a fiber component, and a granular component. In some embodiments, the disposal pond flow barrier consists of the flake component, the fiber component, and the granular component. Although various examples of flake components, fiber components, and granular components are described infra, other embodiments of the flow barrier composition may include other types of flake components, fiber components, and granular components.

The disposal pond flow barrier may be prevent or reduce the infiltration of aqueous fluids from the wastewater disposal ponds into the surrounding environment and ecosystems. The flow barrier may block or otherwise restrict infiltration or leakage of aqueous fluids from the water disposal ponds. Embodiments of the disclosure also include processes for manufacturing and using the flow barrier in a wastewater disposal pond.

In some embodiments, the flake component of the disposal pond flow barrier is an amount in the range of 30% by weight of the total weight (w/w %) to 45 w/w %. In some embodiments, the flake component includes mica flakes, cellophane flakes, or a combination thereof. In some embodiments, the flakes may have a size in the range of 50 microns (μm) to 3000 μm.

In some embodiments, the fiber component of the disposal pond flow barrier is an amount in the range of 25% w/w % to 40 w/w %. In some embodiments, the fiber component includes cellulose fibers, date tree fibers, or a combination thereof. In some embodiments, the cellulose fibers may be Barofibre® manufactured by The Halliburton Company of Houston, Tex., USA. The date tree fibers includes fibers formed from date tree waste obtained from date production or date tree pruning. The date tree waste may be obtained from the species *Phoenix dactylifera*. In some embodiments, the date tree waste is date tree trunks, such that the date tree fibers include date tree trunk fibers. In some embodiments, the date tree waste may include rachis, leaves, and leaflets, such that the date tree waste fibers include date tree rachis fibers, date tree leaf fibers, and date tree leaflet fibers. In some embodiments, the fiber component (for example, cellulose fibers or date tree fibers) have a size (for example, length) in the range of 100 microns (μm) to less than 5000 μm.

In some embodiments, the granular component of the disposal pond flow barrier is an amount in the range of 30% w/w % to 45 w/w %. In some embodiments, the granular component includes ground date tree seeds, ground nut (for example, walnut, pecan, or both) hulls, or any combination thereof. In some embodiments, the ground walnut hulls and ground pecan hulls are Nut Plug® manufactured by Schlumberger of Houston, Tex., USA. The ground date tree seeds may be formed by grinding date tree seeds obtained from the species *Phoenix dactylifera*. In some embodiments, the granular component (for example, ground date tree seeds or ground nut hulls) may have a size (for example, diameter) in the range of about 100 microns (μm) to less than about 3500 μm.

In some embodiments, the date palm seeds may include untreated date tree seeds and the date tree fibers (for example, date tree trunk fibers) may include untreated date tree fibers. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the particles. In such embodiments, the date palm seed particles and date tree fibers may be manufactured without treating before, during, or after crushing, grinding, drying, or any other processing.

FIG. 1 depicts a process 100 for manufacturing and using a disposal pond flow barrier composition in accordance with an embodiment of the disclosure. Initially, a flake component may be obtained (block 102). By way of example, the flake component may include mica flakes, cellophane flakes, or a combination thereof. In some embodiments, the flake component may have a size in the range of 50 microns (μm) to 3000 μm.

Next, a fiber component may be added to the flake component to form a dry mixture (block 104). By way of example, the fiber component may include cellulose fibers, date tree fibers, or a combination thereof. In some embodiments, the cellulose fiber may be Barofibre® manufactured by The Halliburton Company of Houston, Tex., USA. The date tree fibers includes fibers formed from date tree waste obtained from date production or date tree pruning. In some embodiments, the fiber component may have a size in the range of 100 microns (μm) to 5000 μm.

Next a granular component may added to the dry mixture of the flake component and fiber component (block 106). By way of example, the granular component may include ground date tree seeds, ground nut (for example, walnut, pecan, or both) hulls, or any combination thereof. In some embodiments, the ground walnut hulls and ground pecan hulls are Nut Plug® manufactured by Schlumberger of Houston, Tex., USA. In some embodiments, the granular component may have a size (for example, diameter) in the range of about 100 microns (μm) to less than about 3500 μm.

Next, the dry mixture of a flake component, a fiber component, and a granular component may be mixed in a high speed blender to produce a homogenous mixture and form the flow barrier composition (block 108). The mixing may be performed at a speed in the range of 100 revolutions-per-minute (rpm) to 300 rpm. The flow barrier composition may then be used to prevent or reduce infiltration in a wastewater disposal pond at a drilling site. For example, the homogenous mixture may be packed and transported to a drilling site for use as a flow barrier (block 110). Although various examples of flake components, fiber components, and granular components are provided, other embodiments of the flow barrier composition may include other types of flake components, fiber components, and granular components.

FIG. 1 further includes steps for using the flow barrier to reduce or prevent infiltration of wastewater from a disposal pond. An even distribution of the flow barrier maybe applied at the bottom of a disposal pond to form a layer of the flow barrier (block 112). In some embodiments, the bottom of the disposal pond may be compacted before application of the flow barrier. The compacting may be performed using a soil or sand compactor as known in the art. In some embodiments, the soil or sand compactor may have rollers. In other embodiments, the soil or sand compactor may have rammers or vibratory plates.

In some embodiments, the layer of the flow barrier may also cover a portion of the sides of the disposal pond. After application of the flow barrier, the layer of flow barrier may then be compacted (block 114) to a desired thickness. In some embodiments, the flow barrier layer has a thickness in the range of 5 centimeters (cm) to 15 cm. The surface of the flow barrier layer may be dampened using water (block 116). For example, in some embodiments, water may be sprayed onto the top of the flow barrier layer using a commercial sprayer. The water may include water generally available at a drilling site, such as freshwater or produced water.

The flow barrier may be dampened to maintain a minimum moisture content (block 118). In some embodiments, the minimum moisture content of the flow barrier may in the range of about 6% to about 8%. The moisture content may be evaluated using a soil moisture measurement device as known in the art to determine whether the moisture content is less than the minimum moisture content range. If the moisture content of the flow barrier layer is less than the moisture content range, the top of the flow barrier layer may be dampened until the minimum moisture content range of the flow barrier is reached.

Water (that is, waste that includes aqueous fluids such as wastewater) from oil and gas drilling or other operations may then be disposed of in the disposal pond (block 120), with the flow barrier preventing or reducing infiltration of the drilling wastewater into the surrounding environment (for example, into groundwater sources).

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of a flow barrier composition were prepared and tested. Table 1 shows the composition of the example flow barrier composition:

TABLE 1

| EXAMPLE FLOW BARRIER COMPOSITION | | |
| --- | --- | --- |
| Type | Size | Concentration (% weight of the total weight) |
| Flake (Mica flakes, cellophane flakes,) | Fine | 30%-45% |
| Fiber (Barofibre ®, date tree waste fibers) | Fine | 25%-40% |
| Granular (ground date tree seeds, Nut Plug ®) | Fine | 30%-45% |

The flow barrier composition was tested by simulating low permeability compacted ground with and without the presence of the flow barrier composition. To simulate low permeability compacted ground, filter paper having 0.2 micron size openings was placed in a test cell. During testing, a pressure of 10 psi was applied to the paper for time periods of 30 seconds, 3 minutes, and 10 minutes. The pressure was applied to expedite the testing. A first sample (Sample #1) was tested using 100 milliliters (ml) of water without the flow barrier composition. A second sample (Sample #2) was tested using 100 ml water and a 0.5 centimeter (cm) thick layer of the flow barrier composition on top of the filter paper. The results of the testing are summarized in Table 2:

TABLE 2

| TESTING RESULTS FOR SAMPLE #1 AND SAMPLE #2 | | |
| --- | --- | --- |
| Formulation | Sample #1 | Sample #2 |
| Water (ml) | 100 ml | 100 ml |
| Thickness of Example Flow Barrier Composition | 0 | 0.5 cm |
| Pressure | 10 psi | 10 psi |
| 30 second fluid loss | 65 ml | 38 ml |
| 3 minutes fluid loss | Total loss | 74 ml |
| 10 minutes fluid loss | Total loss | 80 ml |

As shown in Table 2, after 30 seconds 65 millimeters of water was lost from Sample #1. After 3 minutes, all 100 ml of water was lost from Sample #1. In contrast, after adding the flow barrier composition, only 38 ml of water was lost from Sample #2 after 30 seconds, 74 ml of water was lost from Sample #2 after 3 minutes, and 80 ml of water was lost from Sample #2 after 10 minutes. Thus, the flow barrier composition reduced the fluid loss by about 45% at 30 seconds and enabled the test cell to retain water after the 3 minutes and 10 minutes time periods.

A third sample (Sample #3) was tested using 100 ml water and a 2 cm thick layer of the flow barrier composition on top of the filter paper. The results of the testing are summarized in Table 3:

TABLE 3

TESTING RESULTS FOR SAMPLE #1 AND SAMPLE #3

| Formulation | Sample #1 | Sample #3 |
| --- | --- | --- |
| Water (ml) | 100 ml | 100 ml |
| Thickness of Example Flow Barrier Composition | 0 | 2 cm |
| Pressure | 10 psi | 10 psi |
| 30 second fluid loss | 65 ml | 18 ml |
| 3 minutes fluid loss | Total loss | 37 ml |
| 10 minutes fluid loss | Total loss | 62 ml |

As shown in Table 3, the amount of fluid loss from Sample #3 as compared to Sample #2 was reduced to only 18 ml of water after 30 seconds, 37 ml of water after 3 minutes, and 62 ml after 10 minutes.

Finally, a fourth sample (Sample #4) was tested using 100 ml water and a 5 cm thick layer of the flow barrier composition on top of the filter paper. The results of the testing are summarized in Table 4:

TABLE 4

TESTING RESULTS FOR SAMPLE #1 AND SAMPLE #4

| Formulation | Sample #1 | Sample #4 |
| --- | --- | --- |
| Water (ml) | 100 ml | 100 ml |
| Thickness of Example Flow Barrier Composition | 0 | 5 cm |
| Pressure | 10 psi | 10 psi |
| 30 second fluid loss | 65 ml | 12 ml |
| 3 minutes fluid loss | Total loss | 33 ml |
| 10 minutes fluid loss | Total loss | 40 ml |

As shown in Table 4, the amount of fluid loss from Sample #4 was reduced to only 12 ml after 30 seconds; thus the flow barrier composition reduced the fluid loss by about 88% as compared to Sample #1 without the flow barrier composition. As shown above, the use of the example flow barrier composition in layers of 0.5 cm, 2 cm, and 5 cm resulted in an increased reduction in the amount of fluid loss. A flow barrier composition having a thickness of at least 5 cm may provide optimal fluid loss prevention, with increasing thicknesses providing an increased reduction in the amount of fluid loss.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for reducing or preventing infiltration of wastewater from a disposal pond, comprising:
    applying a layer of a flow barrier composition to a bottom of the disposal pond, the flow barrier composition comprising:
        a flake component comprising a plurality of mica flakes, a plurality of cellophane flakes, or a combination thereof;
        a fiber component comprising a plurality of cellulose fibers, a plurality of date tree fibers, or a combination thereof, wherein the plurality of date tree fibers comprises fibers formed from date tree trunks; and
        a granular component comprising a plurality of ground nut hulls, a plurality of ground date tree seeds, or a combination thereof; and
    compacting the flow barrier to a thickness after applying the layer of a flow barrier composition to the bottom of the disposal pond.

2. The method of claim 1, wherein the flow barrier composition consists of:
    the flake component;
    the fiber component; and
    the granular component.

3. The method of claim 1, wherein the flake component is selected from the group consisting of the plurality of mica flakes, the plurality of cellophane flakes, and a combination thereof.

4. The method of claim 1, wherein the fiber component is selected from the group consisting of the plurality of cellulose fibers, the plurality of date tree fibers, or a combination thereof.

5. The method of claim 1, wherein the granular component is selected from the group consisting of the plurality of ground nut hulls, the plurality of ground date tree seeds, or a combination thereof.

6. The method of claim 1, comprising maintaining a moisture content in the flow barrier composition, the moisture content in the range of 6% to 8%.

7. The method of claim 1, wherein the thickness is in the range of 5 centimeters (cm) to 15 cm.

8. The method of claim 1, comprising disposing of wastewater into the disposal pond after applying the layer of the flow barrier composition.

9. The method of claim 1, wherein the plurality of date tree fibers have a size in the range of 100 microns ($\mu$m) to 5000 $\mu$m.

10. The method of claim 1, wherein the plurality of date tree seed particles have a size in the range of 100 microns ($\mu$m) to 3500 $\mu$m.

11. The method of claim 1, wherein the flake component is an amount in the range of 30% by weight of the total weight (w/w %) to 45 w/w %, the fiber component is an amount in the range of 25 w/w % to 40 w/w %, and the granular component is an amount in the range of 30 w/w % to 45 w/w %.

* * * * *